(No Model.)
J. W. LATTA.
CASTRATING INSTRUMENT.
No. 598,999. Patented Feb. 15, 1898.
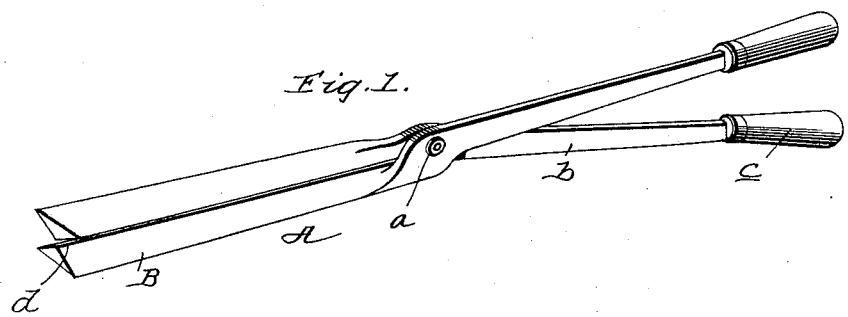
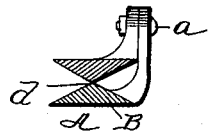
Witnesses:
C. H. Raeder
K. F. Matthews.
Inventor
J. W. Latta
By James J. Sheehy
Attorney
THE NORRIS PETERS CO., PHOTO-LITHO., WASHINGTON, D. C.

UNITED STATES PATENT OFFICE.

JOSHUA W. LATTA, OF SHERMAN, WYOMING.

CASTRATING INSTRUMENT.

SPECIFICATION forming part of Letters Patent No. 598,999, dated February 15, 1898.

Application filed July 3, 1895. Serial No. 554,881. (No model.)

*To all whom it may concern:*

Be it known that I, JOSHUA W. LATTA, a citizen of the United States, residing at Sherman, in the county of Albany and State of Wyoming, have invented certain new and useful Improvements in Castrating Implements; and I do declare the following to be a full, clear, and exact description of the invention, such as will enable others skilled in the art to which it appertains to make and use the same.

My invention relates to improvements in castrating implements; and it has for its general object to provide such an instrument of an exceedingly cheap and simple construction and one through the medium of which the cords and arteries leading to the testicles may be quickly severed and seared, so as to prevent hemorrhage, and this without subjecting the animal to unnecessary pain.

With the foregoing end in view the invention will be fully understood from the following description and claims when taken in conjunction with the accompanying drawings, in which—

Figure 1 is a perspective view of my improved instrument, and Fig. 2 is a transverse section taken through the severing and searing blades or portions.

Referring by letter to said drawings, A indicates the members of my improved instrument. These members are pivotally connected together, preferably at an intermediate point of their length, as indicated by $a$, and they comprise the handles $b$, which may have hand-grasps $c$, of wood or the like, and the severing or searing blades or portions B, which are of obtuse-angle form in cross-section and have the apexes $d$ of their angles arranged contiguous to each other, as shown, for a purpose presently described.

At their rear ends the blades B merge into the flattened handles or handle portions $b$, which are disposed at right angles to a line drawn through the greatest width of the blades and are pivotally connected by the bolt $a$, immediately in rear of the blades, the handle portion of the lower blade B being arranged at one side of the longitudinal center of said blade, as better shown in Fig. 2, so as to permit the apexes of the blades to come together and the handle portion $b$ of the lower blade B to rest above the handle portion $b$ of the upper blade B. This is desirable, since it enables the operator by grasping the handle portions $b$ to press the blades together and thereby quickly cut or sever the cords and arteries and sear the ends of the same to prevent hemorrhage.

In using my improved instrument the blades B are highly heated, and after the animal's testicles have been removed from the scrotum in the usual manner the cords and arteries leading to the testicles are pressed between the blades B of my improved instrument. Such blades B, being highly heated, as stated, and having the contiguous sharp edges, will burn through and sever the cords and arteries almost as quickly and with as little pain to the animal as a sharp knife. As will be seen, a very narrow portion of the cords and arteries will be burned in severing the same, and the severed ends in falling away from the instrument will come in contact with the inclined sides of the blades, and in consequence said ends will be seared to stop the hemorrhage without inflicting unnecessary pain upon the animal.

It will be appreciated from the foregoing that my improved instrument is exceedingly cheap and simple and that it is adapted to quickly perform the function stated and with but a minimum amount of pain to the animal, which is a desideratum.

In some cases only one of the blades may be made of an obtuse-angle form in cross-section, and the other blade may be made of any suitable form. The blade of angular form will, however, have its apex arranged contiguous to the other blade, so as to enable its sides to sear the ends of the cords and arteries when the same are severed.

Having described my invention, what I claim is—

1. The castrating instrument described, consisting essentially of the severing and searing blades B, of obtuse-angle form in cross-section arranged with the sharp apexes of their angles contiguous, the handles or handle portions $b$, formed integral with and having their greatest width disposed at right angles to the greatest width of the blades and crossing each other in rear of the blades, and the bolt $a$, connecting said handles or handle portions where they cross each other; substantially as and for the purpose specified.

2. A castrating instrument comprising two blades, handles formed integral with the blades and crossing each other at the rear ends of the blades, and a transverse bolt pivotally connecting said handles where they cross each other; one of the said blades being of obtuse-angle form in cross-section and having the sharp apex of its angle arranged contiguous to the other blade, substantially as specified.

In testimony whereof I affix my signature in presence of two witnesses.

JOSHUA W. LATTA.

Witnesses:
J. W. BRUNER,
FRANK H. JONES.